March 8, 1938. J. KLEFFMAN 2,110,333
CHAIN SNARE LOCK
Filed Jan. 4, 1935

INVENTOR.
John Kleffman
BY Geo. Stevens
ATTORNEY.

Patented Mar. 8, 1938

2,110,333

UNITED STATES PATENT OFFICE 2,110,333

CHAIN SNARE LOCK

John Kleffman, Hibbing, Minn.

Application January 4, 1935, Serial No. 404

7 Claims. (Cl. 43—87)

This invention relates to devices for catching animals, particularly the larger animals such as brush and timber wolves and the like.

It is a common practice of trappers to snare these animals and the snares used are for the most part formed of a strong steel flexible wire having a locking clasp at one end through which the other end is threaded thereby forming a noose; the clasp permitting the noose to become smaller but preventing its enlargement. When these are used and a wolf is caught thereby, the frantic efforts of the animal to loosen itself frequently kinks the snare wire to such an extent that the snare can no longer be used.

To overcome this defect and yet provide such a snare which will function equally as well, I have substituted a chain for the wire and designed a pair of catches for attachment to the chain, one at either end. One of these catches will lock the chain against movement therethrough in one direction at any point, whereas the other catch will lock the chain only at the connection between the links. Thus when it is desired to set the snare in a manner to kill the animal when caught, the noose would be formed with the catch that would lock the chain at any point, whereas if the animal were to be caught and held alive the other end of the chain with the other catch would be used.

Other objects and advantages of the invention will appear in the following description thereof.

Referring now to the accompanying drawing, forming part of this application, and wherein like reference characters indicate like parts:

Figures 1, 2:
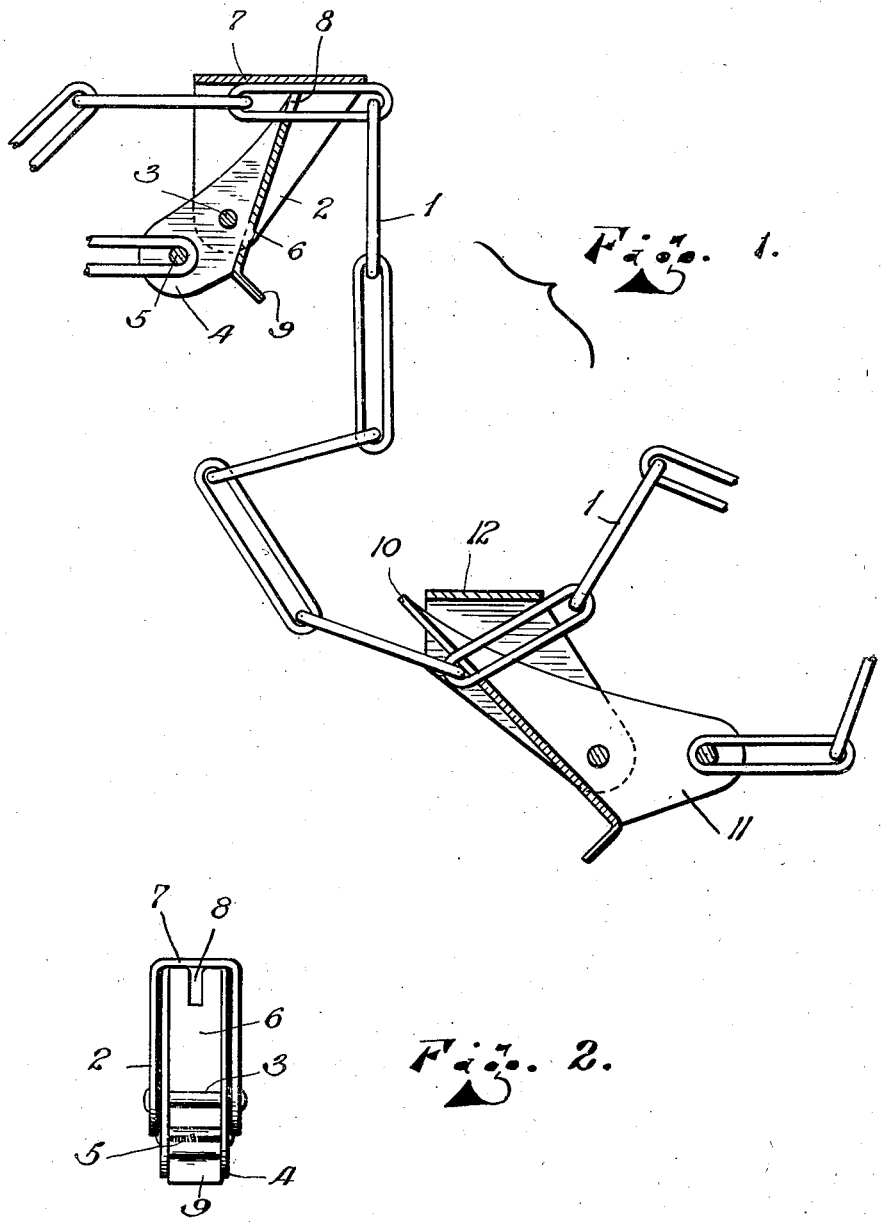
Figure 1 is a broken or fragmental view of my improved chain snare, showing the catches in central vertical section and in the position of locking the chain.
Figure 2 is an end elevation of the catch shown in the uppermost portion of Figure 1, but which the chain detached therefrom.

In the drawing, the numeral 1 represents a strong steel chain and is of sufficient length to have one end anchored about a tree or the like and permit of the other end being formed into a noose and suspended at the proper height over a runway of an animal to be caught. The housing for the catch shown in the upper portion of Figure 1 is indicated at 2, and in side elevation is substantially triangularly shaped and of channel-like construction. Adjacent its lowermost angle and through both sides are formed holes through which extends the rivet 3. This rivet is for the purpose of pivotally supporting the binding or locking lever 4 which is also of channel-like construction, at least, the side walls are bent over in parallel relation to each other and have holes therethrough in which the rivet 3 extends for pivotal support of the lever. Outwardly of the rivet 3 and only through the side walls of the lever 4 extends another rivet 5 which is for the purpose of attaching the chain 1 thereto at one end.

The back 6 of the lever 4 may extend upwardly and almost contact the top 7 of the housing. The upper free end of the lever is bifurcated as indicated at 8, and this bifurcation is just about equal in width to the diameter of the material of which the chain is formed. As previously stated one end of the chain is secured to the lever 4 by means of the rivet 5 and then is looped around forming the noose and passed through the channel housing 2, the lever of course swinging upwardly on its pivotal support 3 to permit of such. When the device is then suspended over the runway of an animal by attaching it to twigs or the like, it is obvious that the weight of the catch hanging from the pivot 3 will cause the end of the lever to bind against the chain so that any backward pull on the chain tending to enlarge the noose will be prevented, whereas the catch will permit at any time the free movement of the chain in the opposite direction which will shorten the diameter of the noose, and if about the neck of an animal struggling to free itself it will break its neck or very quickly choke the animal to death without undue suffering. An angular extension of the lever is indicated at 9 which is merely for convenience in freeing the lever from its binding action on the chain, as for example when removing the noose from the neck of an animal.

With some animals it is desirable from the trapper's standpoint to take them alive and thus I have provided the other catch illustrated in the lower portion of Figure 1 which is quite similar to the other catch excepting that the lever 11 is longer, its bifurcated end extending outwardly of or beyond the top of the housing member 12. The bifurcation in this lever is much longer than that in the other modification so that it will not bind the chain against the top of the housing, but will only hold it at the intersection or connection of one link with the next adjacent one. If the animal struggles hard enough to shorten the noose the length of a link, then, of course, the catch will hold the chain at the next adjacent link connection. In tightening about the neck of an animal however it will reach a point where it can tighten no further, which point is not tight enough to choke the animal and it will remain held to its anchor until the trapper makes his rounds and finds the animal.

I have illustrated in the drawing, one catch on one end of the chain and the other on the other end so that the device becomes a double purpose snare; one catch serving as the anchor while the other functions in connection with the noose; so that the trapper really has two snares in one.

Having thus described my invention, what I claim and desire to secure by Letters Patent, is:

1. A catch for a chain snare comprising a channel shaped member, a lever pivotally united to said member and having means for attaching a chain thereto, said lever being bifurcated at one end for a distance less than the greatest width of said chain and adapted to bindingly engage said chain at any point against the underside of the top of said housing to prevent movement of said chain in one direction.

2. A catch for a chain snare comprising a channel shaped member, a lever pivotally united adjacent one end of the walls thereof and having means at one end for attaching a chain thereto and bifurcated at the other end for a distance greater than the greatest width of said chain, the edges of said bifurcation being engageable with said chain link connections and the top of said housing to prevent movement of said chain in one direction.

3. A catch for a chain snare comprising a relatively narrow channel-shaped housing member having a top, and parallel side walls, a channel-shaped lever pivotally mounted within said housing member and having means at one end thereof for attaching a chain thereto said chain passing between said housing and lever and the other end of said lever having a slot therein engageable with said chain to prevent its movement through said housing in one direction but permit it to move freely in the other direction.

4. A catch for a chain snare comprising a channel-shaped housing member having a top, and parallel side walls, a channel-shaped lever pivotally united thereto, means for securing one end of a chain to said lever, said chain passing between said housing and lever, and said lever being bifurcated at one end and adapted to bind said chain against the top of said housing to prevent movement of said chain in one direction.

5. A catch for a chain snare comprising a relatively narrow channel shaped housing with an elongated flat top and depending parallel sides, a channel-shaped lever pivotally mounted in the lower extremity of the sides of said housing, said lever having means for attaching one end of a chain thereto, said chain passing between the housing and lever, and a slot centrally of a free end of the lever for successively holding the links of said chain when drawn in one direction through said housing.

6. A catch for a chain snare comprising a relatively narrow channel shaped housing with an elongated flat top and depending parallel sides, a channel-shaped lever pivotally united to the lower extremity of the sides of the housing, said lever having a rivet extending from opposite sides thereof for securing one end of a chain thereto, said chain extending therefrom and between the lever and housing, and a slot centrally of the free end of the lever for holding said chain against movement in one direction through said housing.

7. A catch for a chain snare comprising two pivotally united channel shaped members, a pivotal connection for one end of the chain intermediate of the parallel walls of one of the members with the chain passing between the parallel walls of the other member and automatically engageable between the said members when stress is applied by an animal caught in the snare.

JOHN KLEFFMAN.